US008682703B2

(12) United States Patent
Britton et al.

(10) Patent No.: US 8,682,703 B2
(45) Date of Patent: Mar. 25, 2014

(54) SYSTEM AND METHOD FOR FACILITATING STRATEGIC SOURCING AND VENDOR MANAGEMENT

(75) Inventors: Paul Stewart Britton, Sydney (AU); Julie Elisabeth Campling, New York, NY (US); Noreen Dalton, New York, NY (US); Richard Raymond Dowell, Jr., Phoenix, AZ (US); Victor Jodean Grimes, Tempe, AZ (US); Theresa Marie Rynard, Singapore (SG); Catherine Glot, Paris (FR)

(73) Assignee: American Express Travel Related Services Company, Inc., New York, NY (US)

( * ) Notice: Subject to any disclaimer, the term of this patent is extended or adjusted under 35 U.S.C. 154(b) by 1455 days.

(21) Appl. No.: 11/757,203

(22) Filed: Jun. 1, 2007

(65) Prior Publication Data
US 2008/0300933 A1 Dec. 4, 2008

(51) Int. Cl.
*G06Q 10/00* (2012.01)
(52) U.S. Cl.
USPC ........................................................ 705/7.12
(58) Field of Classification Search
None
See application file for complete search history.

(56) References Cited

U.S. PATENT DOCUMENTS

| 6,023,683 | A | 2/2000 | Johnson et al. |
| 6,055,516 | A | 4/2000 | Johnson et al. |
| 6,182,127 | B1 | 1/2001 | Cronin, III et al. |
| 6,505,172 | B1 | 1/2003 | Johnson et al. |
| 6,510,459 | B2 | 1/2003 | Cronin, III et al. |
| 6,892,185 | B1 | 5/2005 | Van Etten et al. |
| 7,047,211 | B1 | 5/2006 | Van Etten et al. |
| 2003/0130879 | A1* | 7/2003 | DelGaudio et al. ............... 705/8 |
| 2003/0149578 | A1 | 8/2003 | Wong |
| 2003/0225634 | A1 | 12/2003 | Skibinski |
| 2004/0128209 | A1* | 7/2004 | Tsai ................................ 705/26 |
| 2004/0162763 | A1* | 8/2004 | Hoskin et al. ................... 705/26 |
| 2005/0114193 | A1 | 5/2005 | Kroening |

OTHER PUBLICATIONS

Kraljic, Caniels and Gelderman, Purchasing strategies in the Kraljic matrix—A power and dependence perspective, downloaded from citeseerx.ist.psu.edu/viewdoc/download?doi=10.1.1.132.2710 on Jun. 16, 2013, pp. 141-155.*
Ariba, Inc.: Spend Management Solutions :: Analysis, Sourcing, Contract Management, http://www.ariba.com.
International Search Report and Written Opinion dated Nov. 27, 2007 in PCT Application No. PCT/US07/71241.

* cited by examiner

*Primary Examiner* — Paul Danneman
(74) *Attorney, Agent, or Firm* — Snell & Wilmer L.L.P.

(57) ABSTRACT

A system and method for facilitating consistent management of a repeatable procurement process within an organization is disclosed. The system enables various members of the organization to follow a set of defined core processes to engage stakeholders by understanding the stakeholder's business and building a trusted advisor relationship. Further, the core processes define an analysis stage that includes an opportunity assessment, development of a strategic plan, development of a commodity profile, and finalizing a sourcing plan. Sourcing includes obtaining sponsorship, assembling a sourcing team, selecting suppliers for an RFP, and selecting a supplier based on a proposal. The core process for performing negotiations and contracting includes developing a negotiation strategy, performing the negotiation, selecting suppliers, and obtaining funding.

35 Claims, 8 Drawing Sheets

SYSTEM AND METHOD FOR FACILITATING STRATEGIC SOURCING AND VENDOR MANAGEMENT

FIELD OF THE INVENTION

The invention generally relates to facilitating strategic sourcing and vendor management, and more particularly, to a system and method for an end-to-end closed loop system for implementing repeatable processes for optimal analysis, sourcing, negotiation, contracting, procurement, reconciliation and payment.

BACKGROUND OF THE INVENTION

The procurement process is an integral part of any organization. As such, organizations are often seeking ways to improve procurement procedures to ensure that the organization has the goods and services it needs to facilitate day-to-day business operations. The improvements to the procurement process often focus on increased efficiencies. Large corporations are especially prone to complex and drawn-out procedures to order and receive needed goods and/or services. For example, the procurement process in corporations typically involves creating a list of approved vendors, obtaining vendor catalogs, completing a purchase order, obtaining approvals (at various levels) for the purchase, placing the order with the vendor, receiving the order, reconciling receipt of the item (e.g., goods and/or services), and finally, routing the item to the appropriate employee and/or department. While such structured procurement systems are often used in most circumstances, the systems are not without their flaws. Moreover, most organizations do not have a clearly defined methodology in place for efficiently sourcing special projects that may require items that fall outside of the goods and services typically acquired by the organization.

In order to increase efficiency and reduce costs within the procurement practice, a strong need exists for a documented and repeatable process using a complete analyze-to-payment work stream. Moreover, organizations have a strong need for a structured solution that enables commodity managers to more closely define their requirements, perform budgetary and strategic analysis, obtain the appropriate authorizations, select vendors, negotiate and contract with selected vendors, and receive and reconcile items.

SUMMARY OF THE INVENTION

The invention includes a system and method for enabling an organization to enhance execution of its procurement activities. In one embodiment, the system includes hardware and software for analyzing, processing and storing project data for the purpose of executing efficient and repeatable procurement processes. The system further manages a workflow for ensuring accurate and efficient completion of each step in a structured and defined procurement process. The method enables commodity managers to perform an analysis of a project by, for example, conducting an opportunity assessment, developing a strategic commodity plan, developing a commodity profile, and/or finalizing a commodity strategy.

The invention further defines exemplary sourcing process steps. The sourcing steps may include obtaining a sponsorship, identifying a sourcing team, pre-planning a sourcing event, selecting potential suppliers, determining a sourcing approach, developing evaluation criteria, developing an RFx recipient list, and conducting evaluations. With a short list of vendors, the system enables commodity managers to, for example, develop a tactical negotiation strategy, conduct negotiations, select suppliers, obtain approved funding documents, finalize contractual documents, and/or conduct supplier enablement activities.

With particular vendors selected, the system enables procurement through, for example, the creation of an order, order management, the receipt of items, and/or the management of asset lifecycles. The disclosed procurement processes further defines the reconciliation and payment activities. Such activities include, for example, receiving and processing invoices, validating invoices, processing reviews, generating payment, uploading electronic invoices, accounting, reconciling and clearing, setting up customer relationship management, processing analytics, and/or the like.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. Moreover, any part of the functions or steps may be preformed manually, automated, using hardware and software, and/or outsourced to or performed by one or more third parties. Furthermore, any reference to singular includes plural embodiments, and any reference to more than one embodiment may include a singular embodiment.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention includes a system and method for facilitating procurement processes within an organization. As used herein, "procurement" or similar terms may include any activity related to arranging, selecting, outsourcing, financing, funding, organizing, shipping and/or implementing the acquisition of items. As used herein, an "item" may include any product, good, service, data, activity, event, step, process and/or the like. In one embodiment, the invention includes computing systems, databases, and a network expressly designed to carry out the processes disclosed herein. However, practitioners will appreciate that the invention is not so limiting. The disclosed procurement steps and processes may be carried out by any known methods including, for example, email, postal mail, facsimile, wireless communications, cell phones, direct verbal communication, and/or any technology now known or hereinafter developed.

Figure 1A:
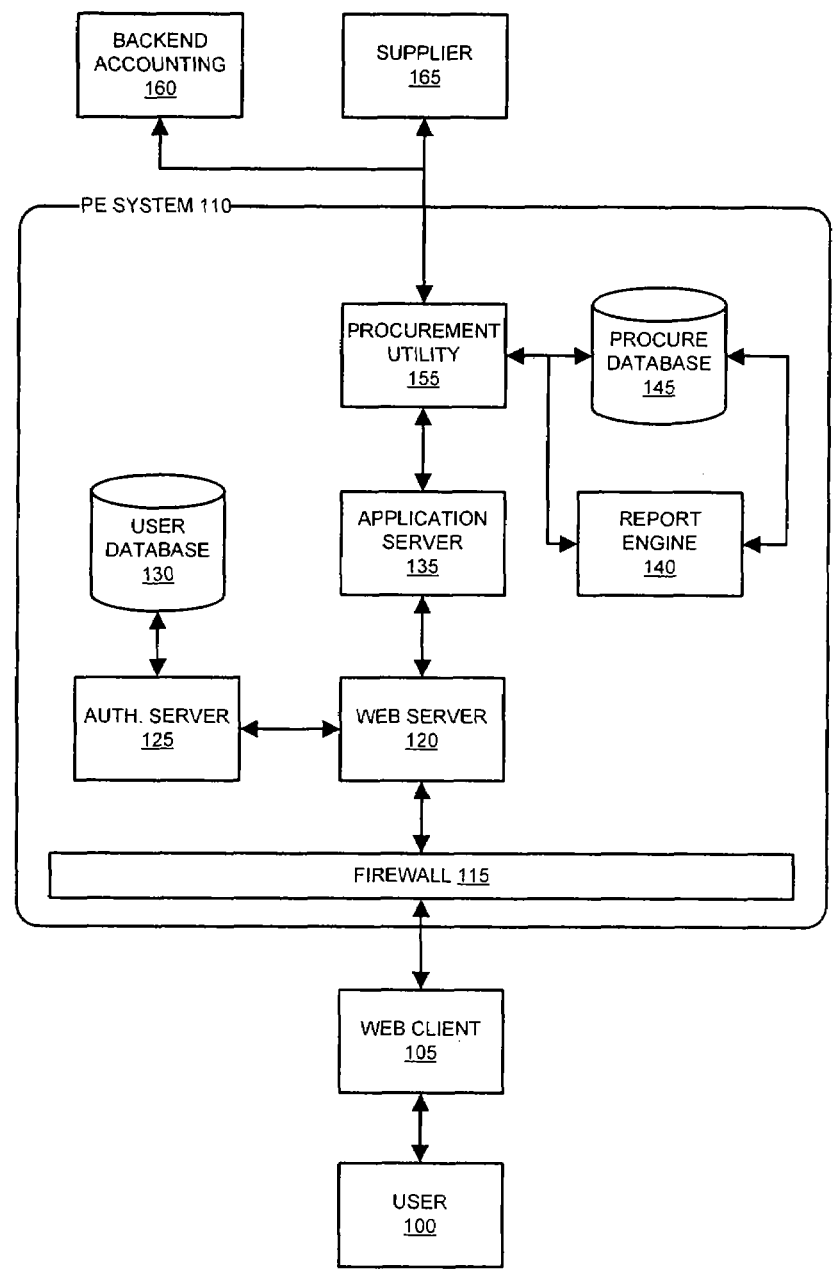
FIG. 1A is a block diagram illustrating the major exemplary system components for managing tasks and workflows for a procurement system, according to exemplary embodiments of the present invention.

With reference to FIG. 1A, process excellence (PE) system 110 facilitates interaction between a user 100 and a procurement utility through, in one embodiment, a web client 105 with a network connection to a web server 120. Web server 120 may employ an authentication server 125 in order to validate and assign proper permissions to authorized users of PE system 110. User database 130 stores user credentials and permissions specific to each user. Web server 120 also employs an application server 135 to manage various applications and utilities that are utilized by PE system 110. In one embodiment, procurement utility 155 is invoked by application server 135 to query procurement database 145, retrieve data, and perform complex calculations and data formatting for presentation to user 100 and/or any other designated third party. Procurement database 145 maintains data related to, for example, business units, departments, managerial hierarchies, projects, templates, suppliers, contracts, and/or the like. Practitioners will appreciate that the invention may incorporate any number and configurations of databases both internal and external to PE system 110 for the purpose of storing any of the data elements described herein. In one embodiment, application server 135 may interface with a report engine 170 to create pre-configured and/or ad-hoc reports representing any data elements detailed herein.

In addition to the components described above, PE system 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user database 130, procurement database 145, as well as any number of other databases, both internal and external to PE system 110 useful in the operation of the invention as disclosed.

As used herein, the term "network" may include any electronic communications device which incorporates both hardware and software components. Communication among the parties may be accomplished through any suitable communication channels, such as, for example, a telephone network, an extranet, an intranet, Internet, point of interaction device (e.g., point of sale device, personal digital assistant (e.g., Palm Pilot®, Blackberry®), cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

In one embodiment, procurement utility 155, or any other PE system 110 component, may interact with any number of additional computing systems and databases in order to facilitate, for example, ordering, billings, accounting, shipping, and the like. Computing systems and databases residing outside of PE system 110 may be administered by an organization's system administrator or any other third party entity directly or indirectly involved in facilitating the disclosed system. Such third party entities may include, for example, a procurement manager, commodity manager, an accounting department, a supplier, a credit account issuer, merchants, a shipping company, and the like.

As will be appreciated by one of ordinary skill in the art, the invention may be embodied as a customization of an existing system, an add-on product, upgraded software, a standalone system (e.g., kiosk), a distributed system, a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interact with PE system 110 to plan, execute, and manage procurement events. User 100 may be, for example, a department manager who accesses PE system 110 to perform analysis, negotiate and contract, select suppliers, procure goods and/or services, and reconcile procurement activities. Moreover, user 100 may interact with PE system 110 to create and access saved project plans, budget analyses, requests for proposals, and/or the like. In another example, user 100 may be an administrator who, for example, interacts with various PE system 110 components to manage one or more vendors through the addition, deletion, and/or modification of data stored in procurement database 145 and/or user database 130. In one embodiment, PE system 110 may provide limited or restricted access for certain people or groups, such as, for example, managers, employees, vendors, or any other third party with an interest in managing procurement activities. User 100 may interface with PE system 110 via any communications protocol, device or method discussed herein or known in the art. In one embodiment, user 100 may interact with the invention via an Internet browser at a web client 105 and/or any other system known in the art.

Web client 105 may comprise any hardware and/or software suitably configured to facilitate input, receipt and/or viewing of any information related to PE system 110 or any information discussed herein. Web client 105 may include any device (e.g., personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with the PE system 110. For example, web client 105 may access the services of the PE system 110 through another server, which may have a direct or indirect connection to web server 120.

As those skilled in the art will appreciate, web client 105 may include an operating system (e.g., WINDOWS NT, 95/98/2000/Vista, OS2, UNIX, LINUX, SOLARIS, MAC OS, etc.) as well as various conventional or customized support software and drivers typically associated with computers. The web client 105 may include any suitable personal computer, network computer, workstation, minicomputer, mainframe or the like. Web client 105 can be in a home or business environment with access to a network. In an exemplary embodiment, access is through a network or the Internet through a commercially available web-browser software package.

Web client 105 may be independently, separately or collectively suitably coupled to the network via data links which includes, for example, a connection to an Internet Service Provider (ISP) as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the procurement, use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, service oriented architecture, biometrics, grid computing and/or mesh computing.

Web server 120 may include any hardware and/or software suitably configured to facilitate communications between web client 105 and one or more PE system 110 components. Further, web server 120 may be configured to transmit data to web client 105 within markup language documents. Web server 120 may operate as a single entity in a single geographic location or as separate computing components located together or in separate geographic locations. Requests originating from client browser 105 may pass through a firewall 115 before being received and processed at web server 120. As used herein, "transmit" may include sending electronic data from one system component to another over a network connection. Additionally, as used herein, "data" may include encompassing information such as commands, queries, files, data for storage, and/or the like in digital or any other form. Web server 120 may provide a suitable web site or other Internet-based graphical user interface which is accessible by users 100, administrators, promotion sponsors, or any other authorized third party. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789.98). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

In one embodiment, firewall 115 comprises any hardware and/or software suitably configured to protect PE system 110 components from users of other networks. Firewall 115 may reside in varying configurations including stateful inspection, proxy based and packet filtering among others. Firewall 115 may be integrated as software within web server 120, any other system component or may reside within another computing device or may take the form of a standalone hardware component.

In one embodiment, applications server 135 includes any hardware and/or software suitably configured to serve applications and data to a connected web client 105. Like web server 120, applications server 135 may communicate with any number of other servers, databases and/or components through any means discussed herein or known in the art. Further, applications server 135 may serve as a conduit between web client 105 and procurement utility 155. Web server 120 may interface with applications server 135 through any means discussed herein or known in the art including a LAN/WAN, for example. Application server 135 may further interact with authentication server 125, procurement database 145, user database 130, report engine 170 or any other PE system 110 component in response to a user 100 request.

To control access to web server 120 or any other component of the invention, web server 120 may invoke authentication server 125 in response to submission of user 100 authentication credentials received at web server 120. In one embodiment, authentication server 125 includes any hardware and/or software suitably configured to receive authentication credentials, encrypt and decrypt credentials, authenticate credentials, and grant access rights according to user 100 pre-defined privileges attached to the credentials. Authentication server 125 may grant varying degrees of application and data level access to user 100 based on user information stored within user database 130.

In one embodiment, user database 130 includes any hardware and/or software suitably configured to facilitate storing authentication and/or privilege information relating to users 100. procurement database 145 stores data relating to product information, promotion participation, transactional histories, promotion schedules, as well as any other related information as disclosed herein. One skilled in the art will appreciate that the invention may employ any number of databases in any number of configurations. For example, a database may be employed to store functions and/or parameters that are used by procurement utility 155 to exchange information with backend accounting systems 175, supplier systems 180, and the like. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set (e.g., loaded, initialized, ready, blocked, removable, or deleted). Subsequent bytes of data may be used to indicate, for example, the identity of the issuer, user, transaction/membership account identifier and/or the like.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to create, update, delete or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, JAVA, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The software elements of the present invention may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts, text messages, and the like. It should be further appreciated that the multiple steps as illustrated and described may be combined into single web pages but have been expanded for the sake of simplicity. In other cases, steps illustrated and described as single process steps may be separated into multiple web pages but have been combined for simplicity.

Referring now to the figures, the block system diagram and process flow diagram represent mere embodiments of the invention and are not intended to limit the scope of the invention as described herein. For example, the steps recited in FIGS. 2-6 may be executed in any order and are not limited to the order presented. It will be appreciated that the following description makes appropriate references not only to the steps depicted in FIGS. 2-6, but also to the various system components as described above with reference to FIG. 1A and the high level process flow of FIG. 1B.

Figure 1B:
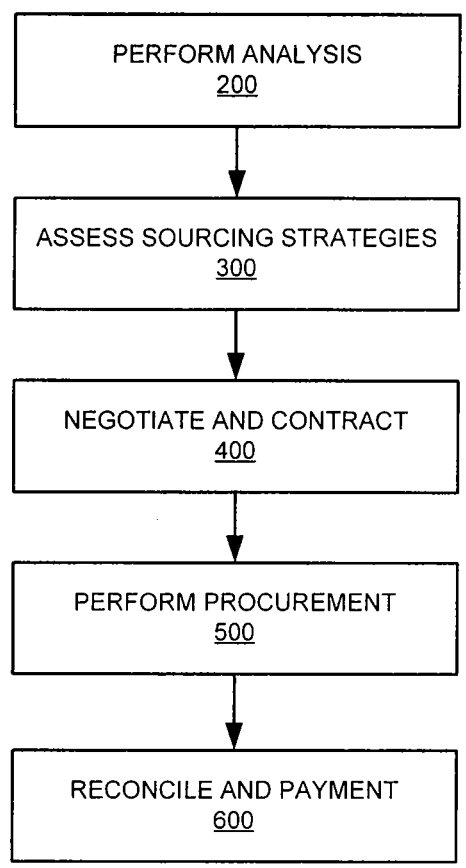
FIG. 1B is a process flow diagram illustrating a high level view of exemplary steps for facilitating strategic sourcing and vendor management, according to exemplary embodiments of the present invention.
Figure 2:
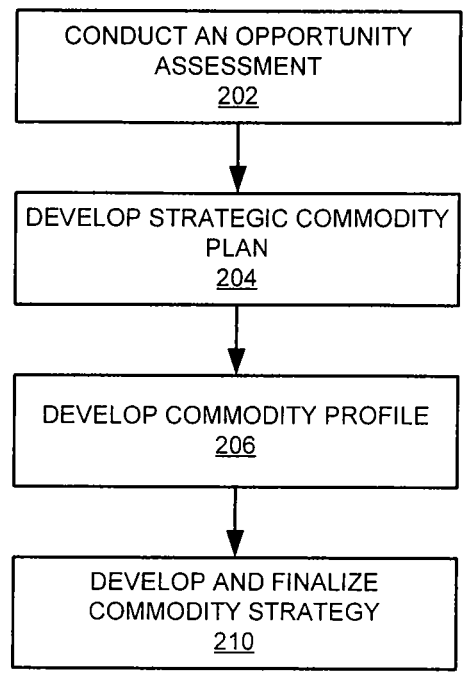
FIG. 2 is a process flow diagram of exemplary steps for procurement analysis, according to exemplary embodiments of the present invention.

With reference to FIG. 2, the disclosed procurement process analyzes 500 an organization's existing business and sourcing strategies, business unit requirements, spend and supply markets, and cost models in order to develop sourcing strategies for a commodity. Specifically, such analysis includes performing a commodity analysis using an opportunity assessment, a commodity plan, a commodity profile, and/or a commodity strategy (FIG. 1B, step 200).

An opportunity assessment (step 202) is performed by collecting input from an organization's commodity managers, strategic directors, business unit budget managers, internal customers, and any other entity related to an opportunity. An opportunity assessment further includes developing an existing commodity strategy, assessing procurement resource requirements, and obtaining approval from internal customers. As used herein, "internal customers" include members of an organization such as, for example, employees, managers, officers, consultants, vendors, and any other third parties designated by the organization to participate in procurement activities. With sign-on from internal customers, contact is made to a global procurement group in order to perform an early assessment of potential vender dependencies. For example, a corporation may be dependent on a single vendor to supply specially designed auto parts. Vender dependencies may further include those vendors which rely on other vendors in order to provide a specific item to the organization. Such dependencies may be stored in procurement database 145 where a vendor record includes a key to another vendor record. User 105 may view such dependencies at web client 105 or may be alerted when selecting vendors as RFP recipients. The commodity manager may complete a project charter defining the projects purpose, which may be reviewed by the commodity manager's leader or any other designated authority.

The commodity manager develops a strategic commodity plan (step 204) which, in one embodiment, is developed following the opportunity assessment. The strategic commodity plan may include, for example, a user requirement, a specification, a populated template, a requirements document, a budget estimate, and/or the like. The process of developing the strategic commodity plan includes planning and structuring data and analysis requirements for the project. Such project requirements may include, for example, an initial budget estimate and/or resources necessary to execute the plan. The strategic commodity plan may be further dependent on creating a communication plan, defining a business scope, and/or interviewing users for plan input.

The commodity manager identifies user needs, analyzes supplier and market data, reviews opportunities, and/or prepares a high level implementation plan. Based on this information, procurement utility retrieves appropriate template documents for completion by the commodity manager. The commodity manager further reviews requirements and prepares a budget estimate that is at least partially based on the requirements. If the cost of executing the project is known, or if the project budget is available, then it is generally included in the business need analysis and/or project charter. The commodity manager reviews the core tools. The core suite of tools enables the team to identify key individuals involved in the sourcing value chain, probe for and establish their needs and/or document the agreed course of action to ensure that the organization has the traction needed to achieve the established goals. The identified core tools that are updated as part of the analysis phase should be approved by a designated approver.

The commodity manager develops a commodity profile (step 206). The commodity profile is constructed based on the process of developing an up-to-date view of spend in scope including analysis of spend, incumbent supplier performance, market drivers and dynamics, cost analysis and/or internal business requirements finalization. A commodity profile may include, for example, current spend, future spend, an acquisition cost model, a market analysis, a supplier profile, a supplier cost driver, and/or a supplier performance driver. The commodity manager may analyze current and future spends, build a total acquisition cost model, and/or perform an RFx development and analysis. The commodity manager may perform an analysis of the supply market, develop new supplier profiles, and/or identify supplier cost and performance drivers. Using the above steps, the commodity manager may update the strategic commodity plan to include data from the commodity profile.

As used herein, an RFx may include a Request for Proposal (RFP), but may further include any type of request designed to collect information in the form of responses from suppliers. RFx collection is typically a sealed process, wherein participants know very little, if anything, about other participants. The RFx may contain an information section describing the specific business scenario and the needs to be solved.

Various tools and templates may be employed to ensure consistency in the way commodity profiles are developed. A spend analysis template walks the commodity manager through a series of steps that include entering spend related data that may be later used to piece together a more thorough spend analysis. A supplier performance analysis provides a more precise view of a supplier's current performance relative to the needs and objectives of the organization's business unit. A regular review with suppliers helps to ensure that they meet their contractual obligations. Moreover, a performance analysis may be followed by facilitating a supplier development program. If the organization is considering the engagement of a supplier within a development program, then supplier performance analysis may help ensure that gaps are identified. Another valuable step in developing the commodity plan is to perform a Cost Benefit Analysis to calculate a financial impact of the project including all necessary investments. In one embodiment, the Cost Benefit Analysis is performed by a global procurement group within the organization.

A market analysis tool provides an overall view into activities occurring at the business, economic, political, and national levels. The market analysis tool provides insight into the mindset of the suppliers to identify those who have a generally low level of enthusiasm in dealing with the organization, as well as those who are eager to win the organization's business. Using RFI tools, the market analysis should identify leverage opportunities in the market, micro and macro trends influencing the organization's sourcing strategies, leading practices, and current players or potential suppliers in the market.

The commodity manager may develop and finalize a commodity strategy (step 210). A commodity strategy may include, for example, a commodity strategic driver, a commodity imperative, a position segment, a relationship analysis, a contracting strategy, and/or a business best practice. The process of developing or updating the commodity strategy or project strategy is based on the findings and analysis of the previous steps. This may include choosing the type of relationship that the organization seeks to create with the suppliers, the organization's approach to the market, the organization's sourcing techniques, and approaches that the organization will implement (e.g., consolidation, demand management, etc.).

In developing a finalized commodity strategy, a commodity positioning matrix tool may be used to identify supply characteristics of commodities and identify the most appropriate sourcing technique in order to deliver a maximum value to the organization. A commodity positioning matrix tool further guides the sourcing team in determining the correct level of resource. A commodity positioning matrix may comprise, for example, a vertical axis for charting business impact and a horizontal axis for charting supply market complexity. The matrix is divided into four quadrants representing leverage, routine, strategic, and bottleneck. The commodity positioning matrix helps to identify specific characteristics of commodities, identify the most appropriate sourcing techniques to deliver maximum value, challenge status quo practices by applying varied techniques to a commodity, and integrate previous analysis.

The finalized commodity strategy may also take into consideration supplier preferencing, which reflects the value that suppliers place on the organization's business. To obtain a more precise view into the supplier mindset, the sourcing team may brainstorm to define characteristics that make a customer unattractive to the supplier. Such characteristics attributed to the organization (customer) by a supplier may include, for example, unreasonable, demanding high quality for an unprofitable market, slow in paying bills, lack of follow-through, and the like. To summarize, the purpose of supplier preferencing is to provide the supplier's perspective to the organization's business, define an implementation path for a sourcing strategy, and challenge established perception (e.g., attractiveness and importance).

A Point of Arrival (POA) vision statement clarifies precisely what the optimal result will look and feel like when it is working well. Everyone on the sourcing team should be aligned with a central vision of the optimal result. The POA vision statement answers the questions regarding where the organization wants to be, what the destination is, and what the best strategy is to get there. The POA vision statement helps to ensure that there is a clear understanding of how the supplier is behaving, how the sourcing results should appear, and how it is all measured.

Identification of commodity strategic drivers and imperatives are performed with the objective of positioning segments against global procurement and/or business unit strategic imperatives. Determination is made of a strategy's required relationships and opportunities through an analysis of existing and perceived supplier perception of the organization. This results in a better understanding of the supplier's view of the organization's business relative to the supplier's importance and relevance to its own strategic objectives.

The commodity manager performs an analysis into contracting strategy and industry best practices by comparing the position of the commodity/project for the organization to the supplier's perception. Based on this assessment, optimal strategies for the organization's business requirements may be accurately determined. By selecting and documenting the commodity strategy, the commodity manager may select the best "path to market" to achieve the desired strategy (i.e., competitive selection vs. supplier development). The strategic commodity plan is updated according to the above disclosed steps to produce a better representation of what a successful plan will look like.

An implementation path selection tool may be employed in finalizing the commodity strategy to create an understanding of the best route to market to achieve maximum results and achieve the desired point of arrival. The implementation path tool further helps the sourcing team choose between competitive supplier selection and supplier development activity. This tool should optimally be used following completion of the analysis phase when the sourcing team is better apprised as to the current internal and market situations and future business needs.

The implementation path selection tool poses four key considerations. The first consideration ascertains whether there is certainty regarding which are the preferred suppliers based on the current and future two years. In answering this question, the sourcing team may consider the business requirements, supplier performance, and supplier cost structure. A second key consideration relates to whether there is clarity concerning the type of relationship desired now and two years into the future. Sub-considerations may include the organization's defined best practice, length of the relationship with the supplier, and value derived for both the organization and the supplier. Third, the sourcing team should consider whether there is certainty into the negotiating power to drive supplier cooperation. The fourth key consideration relates to whether the organization is in a state of readiness for change. If any of the answers to the key considerations is "no", then the best route to market may involve some level of competitive activity. Otherwise, a non-competitive supplier development path may be the optimal implementation route.

With the strategy defined, the commodity manager may develop the proposal that will help "sell" the proposed change(s) to the decision makers within the organization. The proposal may be similar to a sales pitch document; however, it is aimed at internal stakeholders and users. The purpose of the proposal is to provide a compelling case for the adoption of the proposed change(s). In one embodiment, the commodity manager may seek approval for commodity and/or project strategy from, for example, a leader of the commodity managers who works closely with those at the Director level of the organization.

Figure 3:
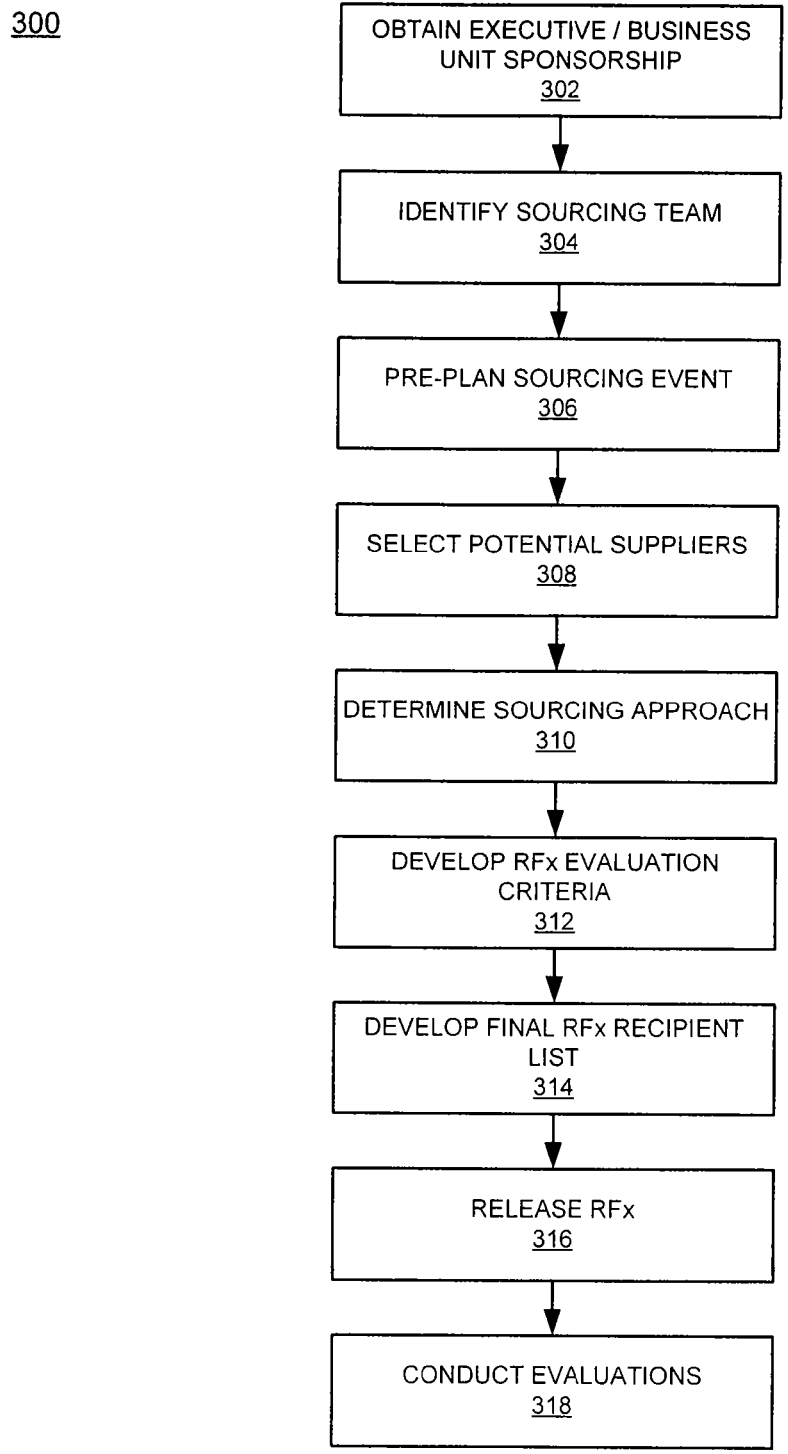
FIG. 3 is a process flow diagram of exemplary steps for procurement sourcing, according to exemplary embodiments of the present invention.

With reference to FIG. 3, the commodity manager assesses a sourcing strategy 300 through obtaining sponsorship, identifying a sourcing team, planning a sourcing event, selecting potential suppliers, determining a sourcing approach, developing evaluation criteria for an RFx, developing a request for transaction, developing a recipient list for the RFx, releasing the RFx, conducting supplier interviews/evaluations, and the like (FIG. 1B, step 300).

The commodity manager may obtain sponsorship (step 302) through an analysis of the sourcing strategy, confirmation of resource availability, confirmation of budget availability, refinement of the project plan, and approval of a project plan. In one embodiment, a presentation detailing the change proposal is delivered to stakeholders, users, and sponsors via a forum in order to enable decision makers and/or participants to ask questions and submit comments prior to offering a decision. Such a forum may be provided by way of a web forum accessed through web client 105 to authorized users 100. In another embodiment, the forum may take place in the setting of an online or conventional meeting. Within the forum, the team leader may explain and demonstrate the competitive advantage that may be obtained through the proposed change. Furthermore, the commodity manager may attempt to win approval for the proposal among various business units and sponsors through a process of analyzing and validating the sourcing strategy document.

To confirm resource availability, the commodity manager prepares a detailed resource plan. The resource plan may include, for example, an estimate of the personnel requirements to execute the project in light of a department's remaining fiscal year budget. Based on the resource plan, the project plan is updated to confirm resource availability and budget requirements. In one embodiment, the commodity manager may further build out, refine, and approve the project plan by eliminating redundant tasks with approval from commodity managers, strategic directors, and the effected business unit. The commodity manager updates the strategic commodity plan according to the analysis phase.

The commodity manager may identify a sourcing team (step 304) by identifying team members (resources) and securing commitments from each identified team member. The process may include identifying resources for the project/commodity strategy implementation and recruiting them. A detailed project plan is prepared to include responsibility, time, and resources desired for each step detailed in the project plan. The commodity manager identifies team members for a core commodity team for the sourcing activity and engages the stakeholders as an extended team. Commitments are secured by briefing the core team and extended team about the level of time and commitment to undertake the project activities. Resource allocation is performed to ensure that specific tasks of the project plan are adequately supported.

With the sourcing team identified, the commodity manager assigns clear roles and responsibilities to each member based on the specific requirements of the project. Also, the commodity manager ensures that the team comprises an appropriate level of representation as well as future buy-in. Expectations should be set in relation to the work to be accomplished and the level of resources necessary from the involved business units, stakeholders, and sourcing team members. During this step, it is helpful for the commodity manager to refer to the stakeholder analysis, process map, and spend analysis in order to create the appropriate representation of the sourcing project team. The activity to be performed should be the other driver for selecting the sourcing team members to ensure allocation of the appropriate skills at the proper place and time within the project lifecycle. The commodity manager should only enroll team members who will contribute to the work at hand. Moreover, the process of creating the project team should be performed in recognition of organizational leadership, core team members, peripheral members, project sponsors, and a steering committee.

The commodity manager may plan a sourcing event (step 306) by developing a project plan, conducting process training, determining resource allocation for each project task, and/or analyzing requirements criteria. Practitioners will appreciate that there may be any number of considerations in addition to the aforementioned and planning a sourcing event may further include and/or rely on other activities such as, for example the creation of a statement of work, development of pricing methodologies, and the like.

The commodity manager may select potential suppliers (step 308) by reviewing requirements, identifying potential suppliers, providing a list of potential suppliers to a relationship manager, conducting an internal analysis, ensuring compliance with procurement rules of engagement, creating an RFx, and/or evaluating a response to the request for information. This process determines which suppliers will receive a Request for Proposal (RFP). A supplier long list may first be constructed based on RFx output, relationship manager discussions, and incumbent suppliers to create an RFx recipient list. The organization's relationship managers are informed of the potential suppliers on the RFx recipient list and the commodity manager may conduct an analysis to ensure vendor integrity. A diversity council is informed of potential suppliers on the long list, which may provide further input prior to the creation of the final RFx recipient list.

The commodity manager may determine a sourcing approach (step 310) by confirming the optimal approach to market, sourcing tools dependent on the sourcing event, and/or updating the project plan, if desired. Determining the sourcing approach may further include defining when sourcing tools should be implemented, identifying optimal sourcing tools, and/or performing scheduling. As used herein, "sourcing tools" may include software and hardware resources as well as defined methodologies that are used to develop a sourcing plan. The commodity manager confirms the implementation path and depending on the output of the strategy and analysis phase, the market approach should be confirmed. A briefing outlining the implementation path may be provided to a PE system 110 administrator for initial input and tools development. The selected sourcing tools are representative of those that will best support the implementation path and strategy (e.g. supplier questionnaire for supplier development, RFP for competitive selection, etc.). Depending on the type of sourcing event, the commodity manager defines which sourcing tools should be used for the event. This process determines that, if the event can be e-sourced, then which online tools are optimal. The project plan should be further updated to reflect the administrator's input to facilitate the creation of the sourcing tools.

The commodity manager may develop evaluation criteria (step 312) for a RFx by reviewing existing RFx templates, identifying RFx criteria, modifying new sourcing strategy, and confirming that the evaluation criteria with stakeholders. Developing evaluation criteria involves the process of translating business requirements into selection criteria and/or evaluation criteria for suppliers' proposals. To create and/or modify RFx evaluation and selection criteria, the commodity manager may consult with the business unit to identify pre-agreed business requirements that will define the online tools used, evaluation criteria and selection criteria.

In one embodiment, the evaluation criteria may include a weighting factor to emphasize criteria elements that are more influential to the selection process. For example, price may not be the primary consideration when selecting suppliers. The commodity manager consults with the business unit to define the weighting of selection criteria as well as to identify "show stoppers" and hurdles relating to suppliers that may interfere with the progression to the negotiation stage.

The commodity manager may develop a RFx by selecting a RFx template, creating the RFx, incorporating additional requirements into the RFx, ensuring compliance with evaluation criteria, ensuring compliance with review requirements, confirming the RFx with stakeholders, and obtaining legal approval. Additionally, the commodity manager may complete a supplier intake form to enable suppliers to be loaded into the RFx event. The completed form is transmitted to PE system 110 where it will be used to identify the suppliers that will be invited to the RFx event.

An RFx master template enables the sourcing team to formalize the organization's requirements, processes, and terms of supplier submissions. Further, the template describes the business requirements developed in the previously discussed tools, assessment questions, and evaluation criteria for the project, which will be sent to the suppliers to solicit responses. The sourcing team may select from any number of RFx master templates based on the nature of the project. Selection of the most appropriate template should be based on selection criteria as translated into the business requirements and the nature of the relationship targeted with prospective suppliers and the commodity specifics.

In one embodiment, the commodity manager may engage in a thorough review of existing RFx templates in light of the business requirements and selection/evaluation criteria described above. The RFx template translates specific business requirements into the finalized supplier request for proposal. To ensure sufficient alignment with the evaluation criteria and review requirements, the RFx document is reviewed for requirements and evaluation criteria by the strategic directors and the commodity managers. Changes may be made to the RFx document accordingly. Furthermore, the RFx document is reviewed by the key stakeholders in order to obtain sign-off.

To develop a RFx recipient list (step 314), the commodity manager reviews a qualified supplier, aligns the recipient list with a relationship manager, coordinates with the relationship manager, finalizes the recipient list, and confirms the recipient list with stakeholders. In constructing the RFx recipient list, the commodity manager reviews a list of qualified suppliers and performs due diligence based on a supplier list that is developed when determining the sourcing approach (step 310). Intense scrutiny and screening is applied to the supplier list to ensure alignment with the organizational and regulatory policies. Such screening may be performed at the commodity manager and strategic director levels of the organization and may include Office of Foreign Assets Control (OFAC) screening.

OFAC is an agency within the U.S. Department of Treasury, which administers and enforces economic and trade sanctions based on U.S. foreign policy. OFAC further ensures that U.S. trade complies with national security goals against targeted foreign countries, terrorists, international narcotics traffickers, and those engaged in activities related to the proliferation of weapons of mass destruction. OFAC acts under the Presidential wartime and national emergency powers, as well as authority granted by specific legislation, to impose controls on transactions and freeze foreign assets under U.S. jurisdiction. To ensure that suppliers are not listed by OFAC, the commodity manager, or other sourcing team member, may access the OFAC web site and enter the potential supplier's name to search for presence on the list. Searches should be performed under multiple spellings (e.g., IBM, I.B.M., International Business Machines, etc.) as well as under both international and U.S. spellings. If a supplier is found listed by OFAC, the supplier should be removed from the qualified supplier list depending on the nature of the listing.

The qualified supplier list is provided to the organization's diversity council and relationship managers in order to keep them apprised as to the recipient list of the RFx document. Lacking objection from the diversity council and/or relationship managers in regard to the supplier list, the final recipient list is confirmed by the key stakeholders. Prior to the release of the RFx, identified suppliers are invited to a sourcing event. The invitation process may include confirming that each supplier has signed a Non-Disclosure Agreement (NDA). If no agreement has been signed by one or more suppliers, then a non-disclosure agreement should be sent along with the invitation.

When needed, an NDA template is intended to protect the organization's sensitive information and intentions during the sourcing event and ensure that confidential information is not disclosed by the suppliers. A NDA should be used for all new projects, even when the supplier is an incumbent supplier and has an existing NDA. Practitioners will appreciate that due to legal inconsistencies among differing nations, the NDA may be negotiated with the approval of an authorized company official and/or group (e.g., Legal, Contracts, Policy and Compliance Group, etc.).

In one embodiment, the NDA may not be sent with the initiation, but only after receiving participation confirmations from the invited suppliers. Follow-up is performed to ensure that signed non-disclosure agreements are received from each participating supplier. In some circumstances, it may be necessary or desirable to liaison with the organization's general counsel to ensure that the non-disclosure agreements are legally sound.

The commodity manager finalizes the sourcing invitation to invite suppliers to the sourcing event and confirms participants. Specifically, the selected suppliers from the final RFx list that were previously approved by the organization's key stakeholders are invited to participate in the sourcing event and the commodity manager confirms the participant list prior to sending out invitations. A sourcing invitation letter is distributed to all suppliers on the participant list prior to publishing the event. If the event is a reverse auction, the invitation letter should be enhanced to include specialized instructions that the supplier will need in order to participate. Such special instructions may include information sufficient to enable participants to perform pre-event estimates and analyses based on the items that the organization seeks to procure.

As used herein, a reverse auction, enables the buyer to create a sourcing event for a single item and invite a number of suppliers to bid on it. The bidders are typically able to view information relating to their position in the auction, and may offer decreasing prices to sell the item until no supplier is willing to lower the price further. At that time, the auction closes and the lowest bidder wins to opportunity to sell the item to the buyer. A reverse auction is best used when price is the sole consideration and there is adequate competition among suppliers to drive the price down. The auction process may also include an English Reverse Auction or any other auction process now known or later developed.

The commodity manager may release the RFx (step 316), thereby inviting suppliers to a sourcing event. Activities relating to the release process may include, for example, confirming the sourcing event participants, facilitating a support conference, managing support activity, and/or ensuring receipt of responses from the suppliers. If desired, participating suppliers are briefed and trained to use any specialized software tools if necessary prior to RFx release. The RFx may then be published to any subset of suppliers, thereby launching the RFx. Supplier responses to the scheduled event are received and acknowledgement of the receipt may be sent to each respondent.

In one embodiment, the event may be geared toward supplier development. In such a case, a supplier questionnaire is published with the RFx. Supplier development may be undertaken by an organization when no suppliers are identified as being willing and/or capable of performing the requested work or supplying the needed goods. Practitioners will appreciate that supplier development may take many different forms and vary significantly from organization to organization. In one embodiment, a supplier development enables commodity managers and/or sourcing team members to develop suppliers in order to add value beyond contractual obligations, consistently exceed service, and deliver a lowest overall cost. Supplier development may also be used to establish business and improvement goals that are in the best interest of the organization and supplier. In direct relation to suppliers, supplier development increases organizational/management visibility, strengthens relationships by integrating suppliers into the organization's business processes, enables the supplier to share the benefits of joint process improvement, and increases the supplier's business with the organization.

The commodity manager may interview suppliers (step 318) by analyzing supplier RFx responses. The interview process may include, for example, facilitating supplier presentations, evaluating the suppliers, creating a narrowed supplier list, ensuring that the narrowed supplier list is compliant with a relationship manager, ensuring that the narrowed supplier list is compliant with procurement rules of engagement, and/or confirming the interview with the organization's key stakeholders. In one embodiment, the commodity manager may analyze supplier RFx responses against defined evaluation and selection criteria. These activities contribute to the creation of a more targeted supplier short list in order to conduct supplier due diligence and present the short listing of suppliers to the organization's key stakeholders.

The responses received from the launched event are evaluated and modeled with the evaluation criteria from the RFx evaluation tool. Various procurement management tools including utilities for performing RFx evaluations are commercially available. For example, Ariba, Inc. markets various software tools for managing a variety of functions relating to procurement. Suppliers may further present their proposals to the sourcing team and an extended team if desired by the organization. In one embodiment, the commodity manager may perform a second round of supplier due diligence to create a reduced or more optimized supplier list. The organization's relationship manager may review the supplier sort list to highlight issues and/or opportunities prior to the presentation to sponsors. The qualified supplier list may further be reviewed by the organizations diversity council and/or legal department to ensure compliance with internal and external laws, regulations, and standards. Any core tools that are modified as part of the sourcing phase should be approved by the business unit owner, stakeholders, client, or any other designated party.

A supplier analysis tool may be employed at this stage to conduct supplier financial assessment, reduce risk related to supplier financial stability, and to provide insight into supplier cost structures. The supplier analysis tool provides a score that based on a variety of inputs relating to the supplier's overall health. Such inputs may include, for example, current assets, current liabilities, total assets, long term debt, retained earnings, net sales revenue, earnings before interest and taxes, market value of equity, and the like. The tool provides a score based on whether the supplier is a public manufacturer, private manufacturer, or non-manufacturer and represents an overall estimated likelihood of bankruptcy.

In one embodiment, a selection criteria template may be used when conducting supplier evaluations to narrow down a list of potential suppliers according to who is most likely able to deliver within the established business requirements. The selection criteria template helps the sourcing team to evaluate potential suppliers against the business requirements expressed by stakeholders within the organization and translating the organization's needs into objective measures and matrices. The selection criteria template also fosters the creation of a level playing field through the ranking of suppliers and delivering optimum sourcing solutions. In one embodiment, selection criteria include weighted hurdles and ratings based on how well the suppliers can provide the needed goods and/or services. Creating supplier selections can be further broken down into two stages. The first stage translates business requirements into specific selection criteria. The second state includes the weighted selection criteria and assessing the supplier responses.

Figure 4:
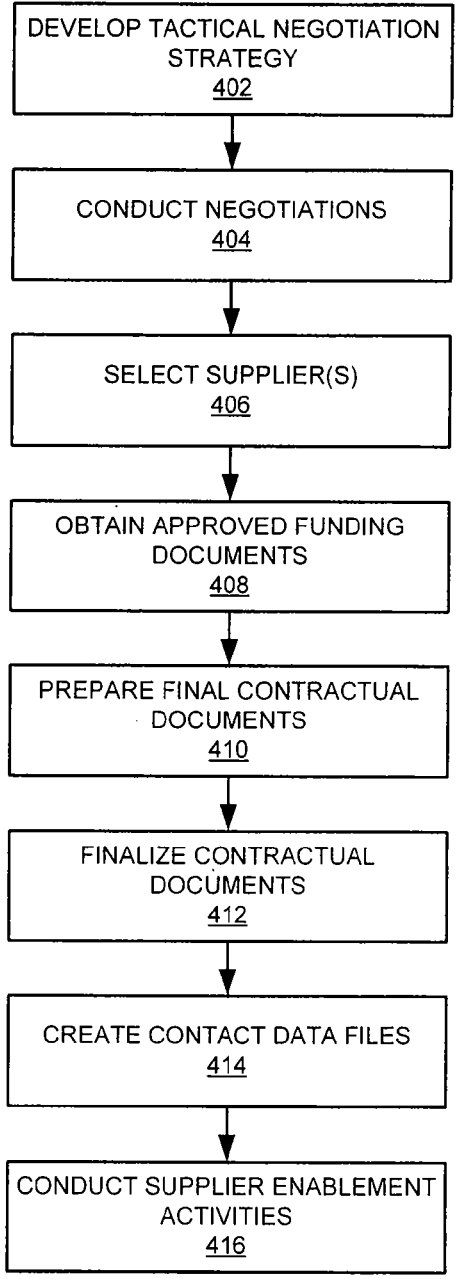
FIG. 4 is a process flow diagram of exemplary steps for vendor negotiation and contracting, according to exemplary embodiments of the present invention.

With reference to FIG. 4, a process for negotiating a contract 400 may include, for example, developing a negotiation strategy, conducting the negotiation, selecting a supplier based on the negotiation, obtaining funding, preparing a contract based on the negotiation, recording the contract, and/or conducting enablement activities for the supplier (FIG. 1B, step 400).

The commodity manager may develop a negotiation strategy (step 402) by selecting and confirming participants for the negotiation team. Development of the negotiation strategy may further include identifying the organizations needs, the organization's desires, and gaps within the RFx responses from the supplier list. The commodity manager may further analyze each team member in light of their availability, strengths, skill sets, and/or the like in order to assign specific roles. The commodity manager and negotiation team should work together to develop the negotiation strategy. In one embodiment, worksheets may be provided in order to help the team to narrow in on and focus on strategy elements best suited for the particular supplier negotiation.

A sound negotiation plan should summarize the entry position such as, for example, the negotiation starting point, tradeables and their values, balance of power and how best to use it. The negotiation plan should further summarize the desired high-level output representing where the organization would want to see each supplier and how the organization will condition the supplier. Roles should be clarified and included in the plan if the negotiation will be conducted by the team. Finally, the negotiation team should record the overall target for the negotiation and fully document a back-up plan. With a negotiation strategy defined, the strategy and plan should be reviewed by the commodity manager and/or any other designated third-party reviewers.

The commodity manager and/or negotiation team may conduct the negotiation (step 404) by conducting a first round negotiation in substantial compliance with the approved negotiation strategy and plan. At the completion of a negotiation session, the commodity manager may evaluate the negotiation results to determine whether a second negotiation is needed and/or desired. Again, if the commodity manager evaluates the results of a second negotiation and determines that the defined results where not achieved, a third negotiation may be conducted. Following a successful negotiation, the commodity manager may develop a recommendation based on the negotiation results and present the recommendation to a sponsor for approval.

In one embodiment, the negotiation team may conduct negotiations through implementation of the negotiation strategy, meeting with suppliers individually, and/or performing a reverse auction with all, or a subset of, the participating suppliers. The negotiation team may conduct as many negotiation sessions and/or reverse auctions as needed in order to meet the negotiation goals. To determine whether further negotiations and/or reverse auctions are needed, the team evaluates the negotiation results against the defined objectives. When the negotiation sessions and/or reverse auctions are complete, the team selects potential supplier(s) to present to the sponsor.

A final cost benefit analysis may be performed following the selection of potential suppliers in order to calculate the financial impact of the project including all necessary investments. Cost benefit analysis may be developed on an ad-hoc basis and by the organizations global procurement group or any other designated group or party with knowledge in developing accurate cost benefit analysis.

The commodity manager may select a supplier based on supplier negotiation (step 406) by ensuring that the selection complies with a relationship manager, a business unit sales team, a vender relationship manager, and/or any other designated internal or external party. The commodity manager further finalizes terms and conditions to develop a final recommendation to present to a sponsor for approval. When the selection is approved, the commodity manager may notify the selected supplier as well as notify those suppliers that were not selected. In one embodiment, the notification may include reasons for selecting and/or not selecting a supplier. Such notification may help non-selected suppliers to understand the organization's needs and desires for possible future supplier selections.

The commodity manager may obtain funding (step 408) by obtaining financial authorization from, for example, the responsible business unit. Moreover, a number of steps may be incorporated into obtaining funding based on a negotiated project including, for example, obtaining document authorization and obtaining procurement authorization. Practitioners will appreciate that the step of obtaining funding may vary from organization to organization. However, most will require approval of funding documentation and authorization for the procurement itself. In one embodiment, financial approval is obtained from the affected business unit.

The commodity manager may prepare a contract based on the negotiation (step 410) by preparing contractual documentation. Preparing contractual documentation may further include, for example, preparing operational documentation, obtaining sponsor authorization the contractual documentation and operational documentation, obtaining supplier authorization, obtaining internal signatures, and/or informing the affected business unit of the completion of the contractual documentation. In one embodiment, the organization may prepare finalized contractual documents (step 412) based on the culmination of contractual documentation that was prepared for the various authorizations.

When a contract is finalized, an electronic representation of the contract may be stored in a database record (step 414). The electronic representation may subsequently be distributed among stakeholders and/or any other designated internal or external recipient. Practitioners will appreciate that an electronic representation may be distributed through known technologies including, for example, email, facsimile, Internet, and the like. In one embodiment, the organization may maintain an electronic contract catalog. Thus, all or a subset of the data from the contract may be entered into a contract catalog. Moreover, the electronic representation of the contract may be transmitted to a file repository for long term storage.

Figure 5:
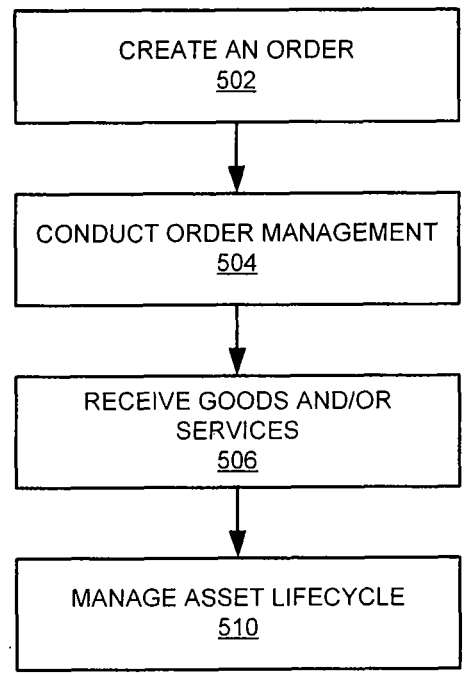
FIG. 5 is a process flow diagram of exemplary steps for procuring items from a vendor, according to exemplary embodiments of the present invention; and, FIG. 6 is a process flow diagram of exemplary steps for reconciliation and payment for procurement, according to exemplary embodiments of the present invention.

The commodity manager may conduct activities directed toward the enablement of a supplier (step 416) by, for example, facilitating a change management communication, finalizing a supplier analysis, assigning an identification number to the contract, determining payment viability, compiling a future payment plan, analyzing the payment plan and viability, establishing a supplier network account, confirming a supplier account in an account database, facilitating execution of the contract, and/or measuring performance based on the contract With a contract in place, processes are implemented to ensure consistency, expediency, and accuracy in procuring the contracted item. With reference to FIG. 5, the organization may procure an item 500 by, for example, creating an order for the item, conducting order management, receiving the item, and/or managing the item lifecycle (FIG. 1B, step 500). The commodity manager may create an order for an item (step 502) by creating a request for the order. A request for an order may comprise standardized processes and/or templates providing a uniform methodology for communicating an order request to the appropriate personnel within the organization. Creating the order may further include confirming pricing compliance with the contract, identifying supporting documentation, submitting the request for order and the supporting documentation for approval, obtaining financial approval for the request, creating a purchase order, and/or submitting the purchase order to a supplier. The commodity manager may facilitate order management (step 504) by, for example, managing order fulfillment, managing back order processing, managing order deliverables, and/or documenting order milestones.

After the item received and/or service rendered (step 506), the commodity manager manages the asset lifecycle (step 510). Managing the asset throughout its lifecycle is essential for making informed business decisions, optimizing the existing infrastructure, cutting support costs, and planning overall capital expenditures. The organization's asset lifecycle management strategy should be flexible and innovative, extending all the way from initial procurement to final disposal.

Figure 6:
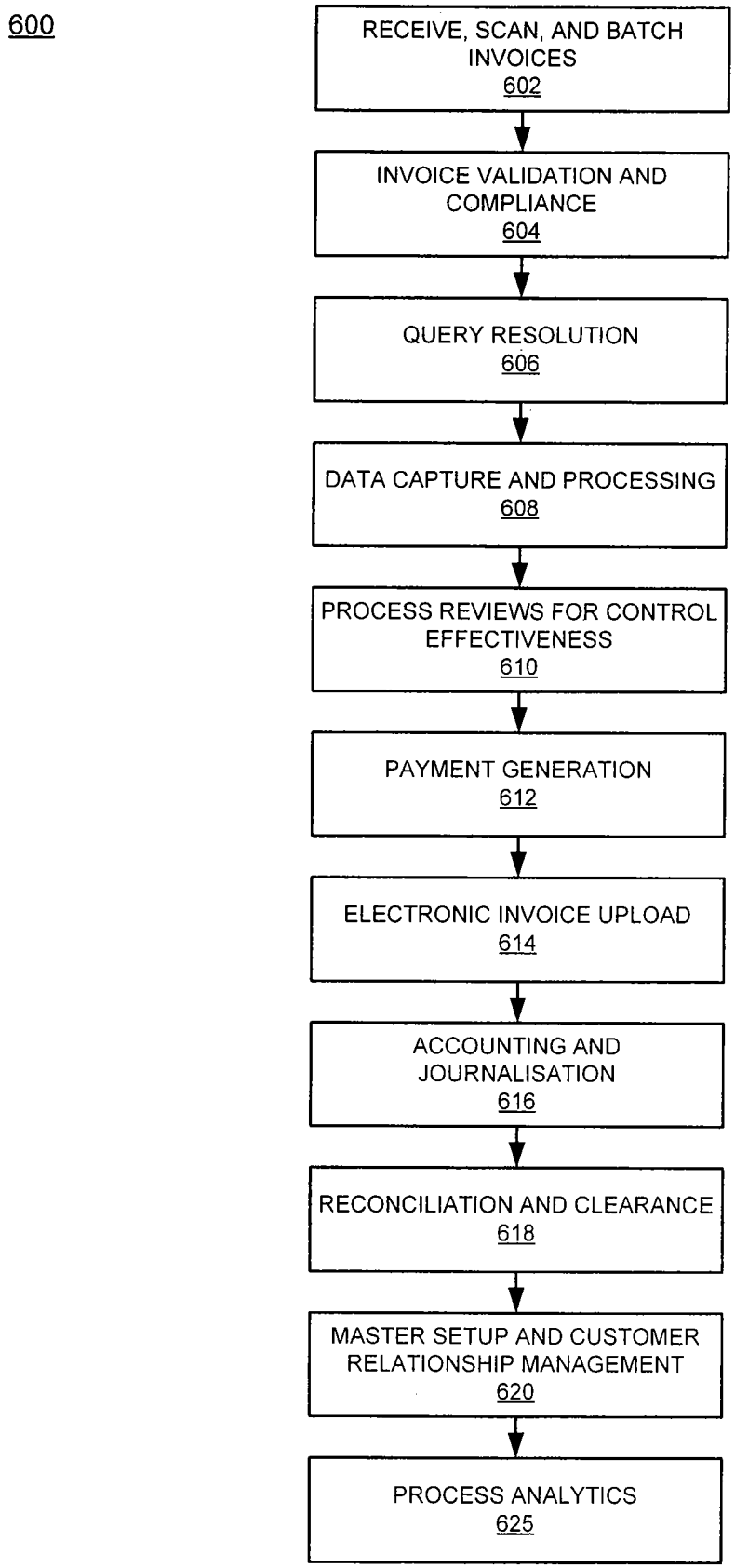
Figure 7:
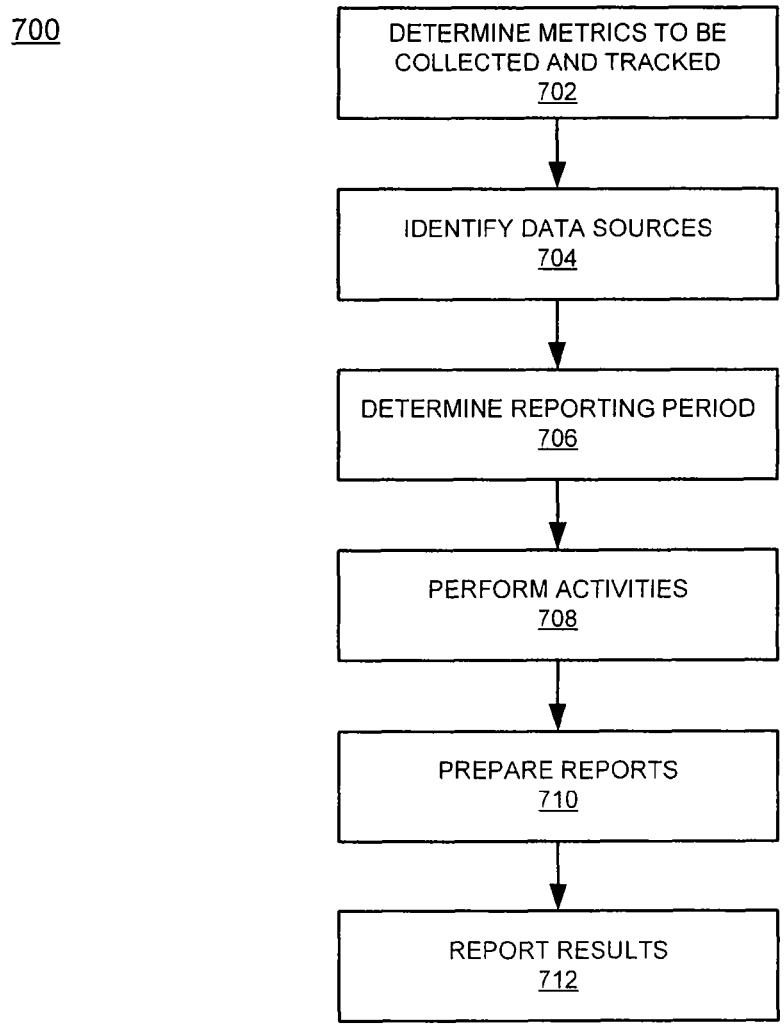
FIG. 7 is a process flow diagram of exemplary steps for determining metrics to be collected and tracked over a determined reporting period, analyzing the metrics and reporting the results.

With reference to FIG. 6, the commodity manager oversees the reconciliation of the transaction relating to the procurement 600. Reconciliation may include, for example, receiving an invoice for the item, processing the invoice, performing a query resolution, capturing transaction data, processing transaction data, reviewing processing, generating a payment based on the transaction data, performing accounting based on the transaction data, reconciling the transaction, entering information relating to the transaction into a contact database, and/or performing a process analysis (FIG. 1B, step 600).

When a procured item is received at the organization, it may be accompanied with an invoice confirming, for example, the item purchase, quantity, price per unit, subtotal due, taxes, total due, and/or the like. The commodity manager receives the invoice (step 602) and validates the invoice for the item, sorts the invoice according to an item category, batches the invoice, scans the invoice, rejects the invoice when it is defective, and/or maintains an invoice log.

To ensure that the invoice is compliant with a negotiated contract (step 604), the commodity manager validates the approval requirements for the invoice. The approval requirements are defined by the organization to ensure consistent compliance across business units. Further, the commodity manager takes steps to ensure that the invoice is compliant with a regulatory policy and matches the invoice to a purchase order.

The commodity manager may perform a query resolution (step 606) by monitoring queries relating to inadequate and/or missing information for invoice processing. The commodity manager may, for example, capture transaction data (step 608) from an accounts payable system, perform batch balancing for the transaction data, and/or post the transaction data. Transaction data is further processed (step 610) by analyzing invoices to determine non-compliance relating to transaction data inconsistency and/or taxation policy. Processing may be reviewed for control effectiveness (step 610) by selecting a bank for a payment schedule and submitting a payment confirmation to market. Payment is provided based on transaction data (step 612) by, for example, payment settlement processing, performing a batch feed upload of the transaction data, uploading batches, and/or resolving rejected transaction data. In one embodiment, the invoice may be added to centralized accounting systems by way of electronic invoice upload (step 614)

The commodity manager may perform accounting based on transaction data (step 616) by performing a month-end accounting and uploading accounting entries from accounts payable to a general ledger. The transaction is reconciled and cleared (step 618) by, for example, researching an open transaction for a payable account, researching an aged transaction for the account payable, passing rectification entries, providing SL support to Accounts Receivable, and performing a journal entry review.

In one embodiment, information relating to the transaction is entered into a contact database (step 620) by, for example, performing a vendor master setup, performing an approval code setup, and/or managing inbound queries to a customer liaison. A process analysis step (step 625), for example, includes compiling process metrics, analyzing procurement spend, reporting on bypass control, and/or reporting on taxes. Practitioners will appreciate that the steps outlines above in reference to FIG. 6 are presented for explanation only and are not intended to limit the scope of the invention. Varying organizations employ accounting practices in a wide variety of manners according to their business type and unique needs.

While the steps outlined above may represent certain specific embodiments of the invention, practitioners will appreciate that there are any number of methods, computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A method for procuring an item, said method including:
    performing, by a computer based system for facilitating strategic sourcing and vendor management, a commodity analysis using an opportunity assessment and a commodity strategy to achieve a supplier list;
    developing, by said computer based system, a sourcing strategy by creating a narrowed supplier list based on supplier preferencing, wherein the supplier list is narrowed based on elimination of unattractive characteristics for a relationship, ensuring that said narrowed supplier list is compliant with a relationship manager and ensuring that said narrowed supplier list is compliant with procurement rules of engagement,
        wherein said developing said sourcing strategy further comprises obtaining sponsorship,
        wherein said obtaining sponsorship includes receiving approval of a project plan by a destination approver,
        wherein said developing said sourcing strategy further comprises performing an interview with key stakeholders of an organization associated with said strategic sourcing;
    further developing, by said computer based system, said sourcing strategy by selecting potential suppliers;
    negotiating, by said computer based system, a contract by conducting said negotiation with potential suppliers, selecting a supplier based on said negotiation, and preparing a contract based on said negotiation, creating a data file for said contract, and conducting enablement activities for said supplier;
        procuring, by said computer based system, a contracted for item by at least one of:
    creating an order for said item, conducting order management, and receiving said item;
        managing, by said computer based system, a lifecycle for said item; and
        reconciling, by said computer based system, a transaction relating to said procurement by receiving an invoice, processing said invoice and entering information relating to said transaction into a contact database.

2. The method of claim 1, wherein said opportunity assessment includes at least one of: receiving input from a procurement business unit, developing an existing commodity strategy, assessing procurement resource requirements, and obtaining approval from a customer.

3. The method of claim 1, wherein said performing said commodity analysis further comprises using a commodity plan, wherein said commodity plan includes at least one of: a user requirement, a specification, a populated template, a requirements document, and a budget estimate.

4. The method of claim 1, wherein said performing said commodity analysis further comprises using a commodity profile, wherein said commodity profile includes at least one of: current spend, future spend, an acquisition cost model, a market analysis, a supplier profile, a supplier cost driver, and a supplier performance driver.

5. The method of claim 1, wherein said commodity strategy includes at least one of: a commodity strategic driver, a commodity imperative, a position segment, a relationship analysis, a contracting strategy, and a business best practice.

6. The method of claim 1, wherein said obtaining sponsorship further includes at least one of: analyzing said sourcing strategy, confirming resource availability, confirming budget availability, and refining a project plan.

7. The method of claim 1, wherein said developing said sourcing strategy further comprises identifying a sourcing team, wherein said identifying said sourcing team includes at least one of: identifying team members and securing commitments from said team members.

8. The method of claim 1, wherein said developing said sourcing strategy further comprises planning a sourcing event, wherein said planning said sourcing event includes at least one of: developing a project plan, conducting process training, determining resource allocation for each project task, and analyzing requirements criteria.

9. The method of claim 1, wherein said selecting potential suppliers includes at least one of: reviewing requirements, identifying a potential supplier, providing a list of said potential supplier to a relationship manager, conducting an organizational analysis, ensuring compliance with procurement rules of engagement, creating a request for information, and evaluating a response to said request for information.

10. The method of claim 1, wherein said developing said sourcing strategy further comprises determining a sourcing approach, wherein said determining said sourcing approach includes at least one of: defining when sourcing tools should be implemented, identifying optimal sourcing tools, and performing scheduling.

11. The method of claim 1, wherein said developing said sourcing strategy further comprises developing evaluation criteria for a request for transaction, wherein said developing evaluation criteria for said request for transaction includes at least one of: reviewing existing request for transaction templates, identifying request for transaction criteria, modifying new sourcing strategy, and confirming said evaluation criteria with stakeholders.

12. The method of claim 1, wherein said developing said sourcing strategy further comprises developing a request for transaction, wherein said developing said request for transaction includes at least one of: selecting a request for transaction template, creating said request for transaction, incorporate additional requirements into said request for transaction, ensuring compliance with evaluation criteria, ensuring compliance with review requirements, confirming said request for transaction with stakeholders, and obtaining legal approval.

13. The method of claim 1, wherein said developing said sourcing strategy further comprises developing a recipient list for said request for transaction, wherein said developing said recipient list for said request for transaction includes at least one of: reviewing a qualified supplier, aligning said recipient list with a relationship manager, coordinating with said relationship manager, finalizing said recipient list, and confirming said recipient list with stakeholders.

14. The method of claim 1, wherein said developing said sourcing strategy further comprises releasing said request for transaction, wherein said releasing said request for transaction includes at least one of: inviting suppliers to a sourcing event, confirming sourcing event participants, releasing said request for transaction, facilitating a support conference, managing support activity, and receiving responses from said suppliers.

15. The method of claim 1, wherein said negotiating said contract further comprises developing a negotiation strategy, wherein said developing said negotiation strategy includes at least one of: confirming participants for negotiation team, identifying organizational needs, identifying organizational desires, identifying gaps within a supplier list request for transaction responses, and assigning roles to said participants.

16. The method of claim 1, wherein said conducting said negotiation includes at least one of: conducting a first negotiation, evaluating said first negotiation results, conducting a second negotiation when needed, evaluating said second negotiation results, developing a recommendation based on at least one of: said first negotiation results and said second negotiation results, and confirming said recommendation with a sponsor.

17. The method of claim 1, wherein said selecting a supplier based on said negotiation includes at least one of: ensuring selection compliance with a relationship manager, ensuring selection compliance with a business unit sales team, ensuring selection compliance with a vender relationship manager, finalizing a term, finalizing a condition, developing final recommendation, obtaining approval from sponsor, notifying said selected supplier, and notifying a non-selected supplier.

18. The method of claim 1, wherein said negotiating said contract further comprises obtaining funding, wherein said obtaining funding includes at least one of: obtaining financial authorization, obtaining document authorization, and obtaining procurement authorization.

19. The method of claim 1, wherein said preparing a contract based on said negotiation includes at least one of: preparing contractual documentation, preparing operational documentation, obtaining sponsor authorization for at least one of: said contractual documentation and said operational documentation, obtaining supplier authorization, obtaining internal signatures, and communicating completion of said contract to a business unit.

20. The method of claim 1, wherein said creating a data file for said contract includes at least one of: creating an electronic representation of said contract, distributing said electronic representation, entering contract data into a contract catalog, storing said electronic representation in a database, and sending a contract to a file repository.

21. The method of claim 1, wherein said conducting said enablement activities for a supplier includes at least one of: facilitating a change management communication, finalizing a supplier analysis, assigning an identification number to said contract, determining payment viability, compile a payment history, analyzing said payment history, establishing a supplier network account, confirming a supplier account in an account database, facilitating execution of said contract, and measuring performance based on said contract.

22. The method of claim 1, wherein said creating an order for said item includes at least one of: creating a request for said order, confirming pricing compliance of a contract, identifying supporting documentation, submitting said request and said supporting documentation for approval, obtaining financial approval for said request, creating a purchase order, and submitting said purchase order to a supplier.

23. The method of claim 1, wherein said conducting order management includes at least one of: managing order fulfillment, managing back order processing, managing order deliverables, and documenting order milestones.

24. The method of claim 1, wherein said receiving an invoice includes at least one of: validating said invoice for said item, sorting said invoice according to an item category, batching said invoice, scanning said invoice, rejecting said invoice when it is defective, maintaining an invoice log.

25. The method of claim 1, wherein said processing an invoice includes at least one of: validating approval requirements for said invoice, ensuring that said invoice is compliant with a regulatory policy, ensuring that said invoice is compliant with a regulatory policy, and matching said invoice to a purchase order.

26. The method of claim 1, wherein said reconciling said transaction further comprises performing a query resolution, wherein said performing said query resolution includes monitoring queries relating to at least one of: inadequate and missing information used for invoice processing.

27. The method of claim 1, wherein said reconciling said transaction further comprises capturing transaction data, wherein said capturing transaction data includes at least one of: capturing said transaction data from an accounts payable system, performing batch balancing for said transaction data, and posting said transaction data.

28. The method of claim 1, wherein said reconciling said transaction further comprises said processing transaction data, wherein said processing transaction data includes analyzing invoices to determine non-compliance relating to at least one of: transaction data inconsistency and taxation policy.

29. The method of claim 1, wherein said reconciling said transaction further comprises reviewing processing, wherein said reviewing processing includes at least one of: selecting a bank for a payment schedule and submitting payment confirmation to market.

30. The method of claim 1, wherein said reconciling said transaction further comprises generating a payment based on transaction data, wherein said generating said payment based on transaction data includes at least one of: payment settlement processing, performing a batch feed upload of said transaction data, uploading batches, and resolving rejected transaction data.

31. The method of claim 1, wherein said reconciling said transaction further comprises performing accounting based on transaction data, wherein said performing accounting based on transaction data includes at least one of: performing a month-end accounting and uploading accounting entries from accounts payable to a general ledger.

32. The method of claim 1, wherein said reconciling said transaction further comprises reconciling said transaction, wherein said reconciling said transaction includes at least one of: researching an open said transaction for a payable account, researching an aged said transaction for said account payable, passing rectification entries and performing a journal entry review.

33. The method of claim 1, wherein said entering information relating to said transaction into a contact database includes at least one of: performing a vendor master setup, performing an approval code setup, managing inbound queries to a customer liaison.

34. The method of claim 1, wherein said reconciling said transaction further comprises performing a process analysis, wherein said performing said process analysis includes at least one of: compiling process metrics, analyzing procurement spend, reporting on bypass control, and reporting on taxes.

35. The method of claim 1, wherein the commodity strategy further comprises a commodity positioning matrix, wherein the commodity positioning matrix includes a vertical axis for charting business impact and a horizontal axis for charting supply market complexity, wherein the matrix is divided into four quadrants representing leverage, routine, strategic, and bottleneck.

* * * * *